(12) United States Patent
Thurgood et al.

(10) Patent No.: US 7,735,628 B2
(45) Date of Patent: Jun. 15, 2010

(54) ARTICLE TRANSFER SYSTEM

(75) Inventors: Robin G. Thurgood, Marshall, MI (US); Phillip D. Hillard, Hudson, MI (US)

(73) Assignee: Rennco LLC, West Homer, MI (US)

( * ) Notice: Subject to any disclaimer, the term of this patent is extended or adjusted under 35 U.S.C. 154(b) by 295 days.

(21) Appl. No.: 11/202,798

(22) Filed: Aug. 12, 2005

(65) Prior Publication Data

US 2006/0131130 A1 Jun. 22, 2006

Related U.S. Application Data

(60) Provisional application No. 60/637,358, filed on Dec. 17, 2004.

(51) Int. Cl.
 *B65G 47/24* (2006.01)
(52) U.S. Cl. .................. 198/412; 198/416; 198/394
(58) Field of Classification Search .............. 198/412, 198/416, 394, 377.02, 373, 626.5, 626.1, 198/626.3, 379, 395, 370.07; 209/618, 538, 209/622, 624
See application file for complete search history.

(56) References Cited

U.S. PATENT DOCUMENTS

| | | | | |
|---|---|---|---|---|
| 4,987,721 A | * | 1/1991 | Turtschan | 53/167 |
| 5,048,326 A | * | 9/1991 | Toida et al. | 73/105 |
| 6,006,891 A | * | 12/1999 | Iwano et al. | 198/417 |
| 6,368,204 B1 | * | 4/2002 | Tokoyoda | 453/57 |
| 6,554,122 B2 | | 4/2003 | Auno et al. | |
| 6,678,578 B2 | * | 1/2004 | Holmen et al. | 700/223 |
| 6,776,279 B2 | * | 8/2004 | Krull et al. | 198/626.5 |
| 6,884,016 B2 | * | 4/2005 | Ogle et al. | 414/272 |
| 7,168,909 B2 | * | 1/2007 | Irwin et al. | 414/788.2 |
| 2002/0005338 A1 | | 1/2002 | Auno et al. | |

* cited by examiner

*Primary Examiner*—Gene Crawford
*Assistant Examiner*—Ramya Prakasam
(74) *Attorney, Agent, or Firm*—Thompson Hine LLP (57) ABSTRACT

The present invention provides a transfer system and method for aligning articles. The transfer system comprises a transfer member adapted to transfer the articles along a designated path, an orientation-adjustment portion having an orienter that is adapted to rotate at least a first portion of the articles, and a receiving portion that is adapted to restrict movement of at least a second portion of the articles along the designated path Each of the articles has a surface configuration that allows the articles to compress along an axial direction when at least two of the surface configurations of a respective adjacent two of the articles are aligned, and the receiving portion and the orienter cooperate to align the first portion and the second portion and compress a length of the first portion and the second portion along an axial direction of the articles.

21 Claims, 7 Drawing Sheets

ARTICLE TRANSFER SYSTEM

CROSS REFERENCE TO RELATED APPLICATION

This application is related to U.S. Provisional Patent Application entitled "Article Transfer System" filed on Dec. 17, 2004 and accorded Ser. No. 60/637,358, which is entirely incorporated herein by reference.

TECHNICAL FIELD

The present invention generally relates to a system and method for adjusting the orientation of an article, and more specifically, the present invention relates to a system and method for adjusting the orientation of an article to be packaged.

BACKGROUND

Conventional article transfer systems are known that transfer articles along a designated path. An example of such an article transfer system is a conveyor system that is adapted to transfer articles from an origin to a destination. Another known article transfer system involves a transverse orientation of rollers that rotate in the direction of the intended path and thereby transfer the rotational motion to the article passing thereover.

It is becoming increasingly common to integrate these article transfer systems into automated packaging devices. A wide range of such automated packaging devices is in use today. While these systems do transfer articles from one location to another, these systems do not sufficiently align or orient the articles when multiple articles are stacked by or within the system. For at least this reason, the stacked articles require more packaging material and the like. The present invention was developed in light of these and other drawbacks.

SUMMARY

The present invention provides a transfer system and method for aligning articles. The transfer system comprises a transfer member adapted to transfer the articles along a designated path, an orientation-adjustment portion having an orienter that is adapted to rotate at least a first portion of the articles, and a receiving portion that is adapted to restrict movement of at least a second portion of the articles along the designated path Each of the articles has a surface configuration that allows the articles to compress along an axial direction when at least two of the surface configurations of a respective adjacent two of the articles are aligned, and the receiving portion and the orienter cooperate to align the first portion and the second portion and compress a length of the first portion and the second portion along an axial direction of the articles.

BRIEF DESCRIPTION OF THE DRAWINGS

The accompanying drawings illustrate various embodiments of the present system and method and are a part of the specification. The illustrated embodiments are merely examples of the present apparatus and method and do not limit the scope of the disclosure.

DETAILED DESCRIPTION

Referring now to the drawings, an embodiment of the present invention is shown in detail. The embodiments set forth herein are not intended to be exhaustive, otherwise limit, or restrict the invention to the precise forms and configurations shown in the drawings and disclosed in the following detailed description.

Figure 1:
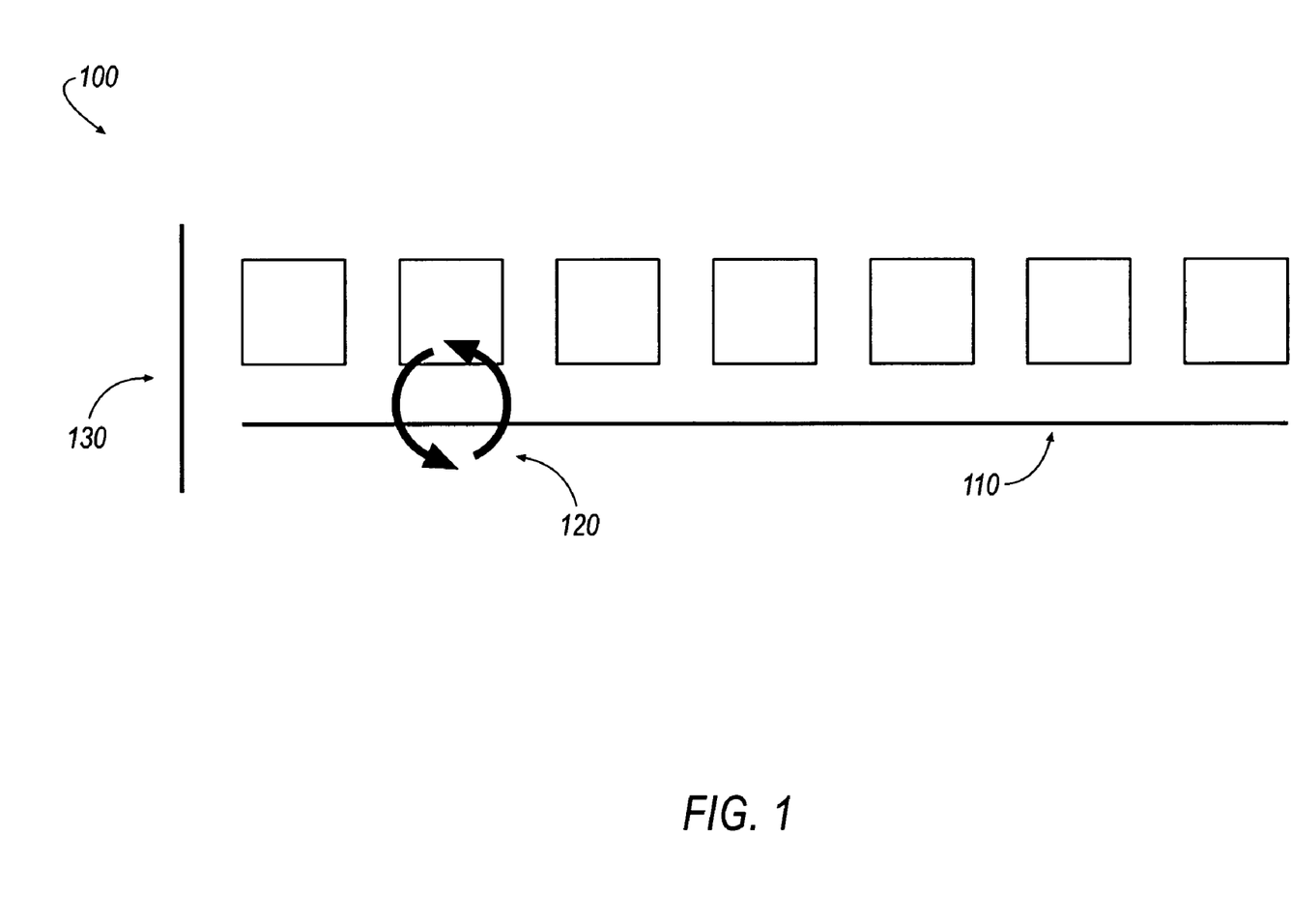
FIG. 1 is a schematic view of an article transfer system according to an embodiment of the present invention.

With reference to FIG. 1, an article transfer system 100 is schematically illustrated, in accordance with the principles of the present invention. In an embodiment, the article transfer system 100 includes an article transfer member 110, an orientation-adjusting portion 120 and a receiving portion 130. The orientation-adjusting portion 120 is positioned at any location on or around the article transfer member 110 to adjust an article passing by way of the article transfer member 100 to the receiving portion 130.

Figure 2:
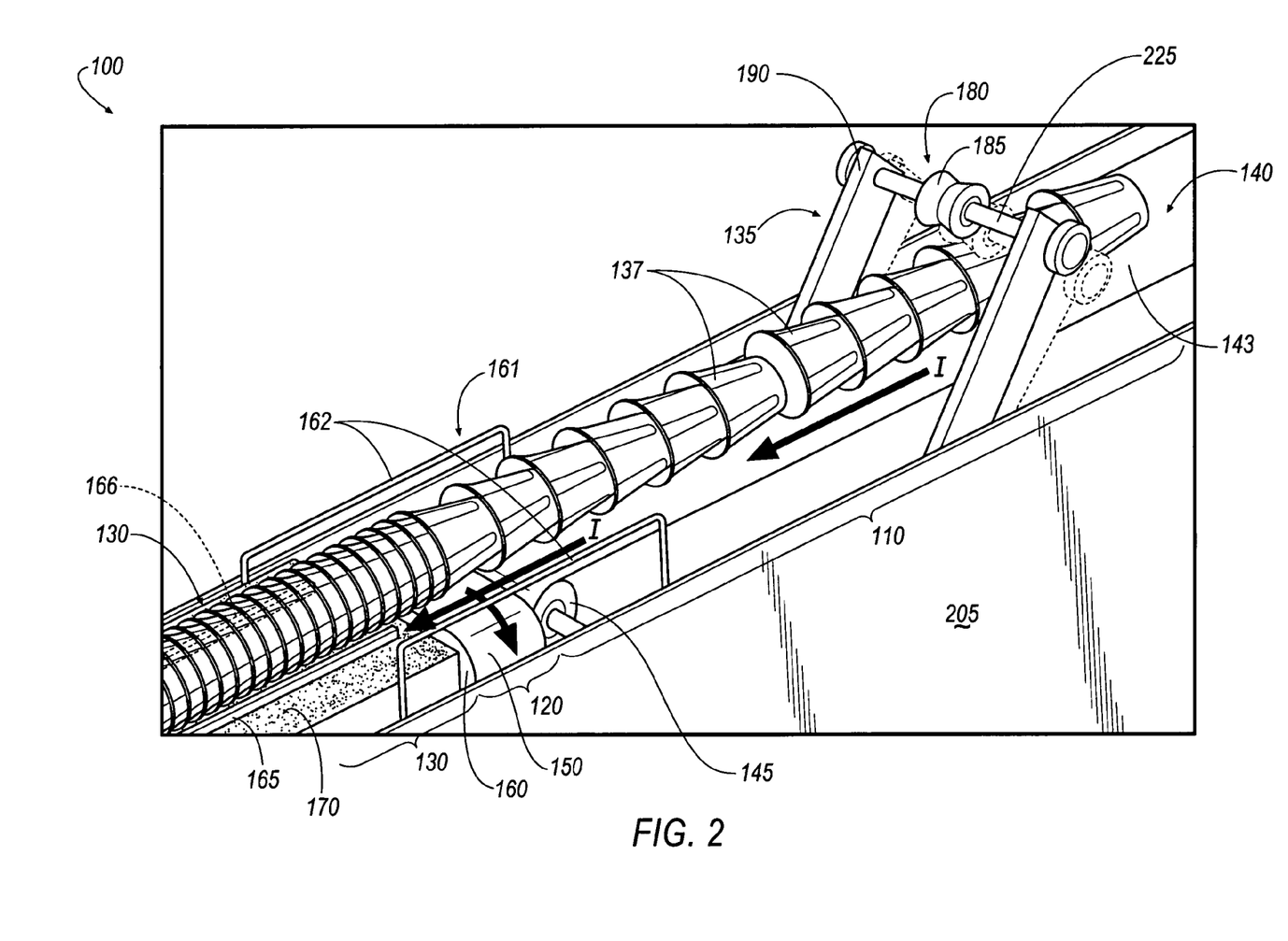
FIG. 2 is a perspective view of an article transfer system according to an embodiment of the present invention.

Referring now to FIG. 2, there is shown a perspective view of an article transfer system 100 according to an embodiment of the present invention. In the illustrated embodiment, the article transfer system 100 includes an article transfer member 110, an orientation-adjusting portion 120, a receiving portion 130, and a compressing member 135.

For purposes of convenience, one article to be transferred though at least portions of the system 100 will be referred to as a cup. In accordance therewith, multiple articles or multiple cups are shown. It should be noted that the present invention can be practiced with any type of article, grouping of articles, stack of articles or the like.

In one example, the system 100 orients the grouping of cups to form a bundled stack of cups that may eventually become packaged in a packaging device. In the example discussed above, the system 100 is utilized to bundle a stack or group of articles that have at least one distinguishing feature, such as a rib, fold, cavity and the like. The distinguishing feature allows the articles to be positioned in a close relationship when the articles are oriented about their axis or rotated in a specific way. Without proper orientation, the articles are spaced due to interference between the distinguishing feature of one article and a portion of an adjacent article. One skilled in the art will recognize that articles other than cups may also have distinguishing features that can be aligned in a similar manner to allow a reduction in the length of the article stack.

Therefore, to minimize the length of an article stack so that the articles become tightly bundled, and therefore in one embodiment, to minimize the amount of packaging material used to encapsulate the articles that form the bundle, the distinguising features of each article will be substantially aligned. In an embodiment, system 100 adjusts the orientation of the articles so that the defining feature of each of the articles is sufficiently aligned with a corresponding distinguishing feature of an article that has already been adjusted and properly oriented. In this manner, the distinguishing feature of each article becomes sufficiently aligned and a bundled article stack is formed.

For illustrative purposes, one possible distinguishing feature of each cup will be referred to as a flute 137. Flute 137 may be defined by an indentation in an outer surface of the cup that forms a corresponding protrusion on the interior of the cup or, alternately, a protrusion on the outer surface of the cup that forms a corresponding indentation on the interior. Therefore, to create the above referenced bundled stack of cups, the orientation of each cup is adjusted to sufficiently align a flute 137 of one cup with the flute 137 of another cup. While system 100 is particularly suited to transfer articles having at least one distinguishing feature, system 100 is not intended to be limited thereto. Alternatively, system 100 may be employed to bundle items that do not have a distinguishing feature.

In the embodiments illustrated in FIGS. 2-5, the article transfer member 110 is a belt assembly 140 that passes the transferred articles through at least portions of the system 110 along a designated path (I). In an embodiment, the belt assembly 140 includes a belt 143 that is mechanically actuated through rollers 145 that are located at various points under the belt 143 and form a portion of the belt assembly 140. The power required to rotate rollers 145 and, therefore, move belt 143, may be provided by various power generating devices, including without limitation, electric motors, pneumatic motors, hydraulic motors and the like.

Although one article transfer member 110 is provided to drive the belt 143, other configurations and methods to drive the belt 143 may be employed. Moreover, although a belt assembly 140 is presently disclosed, other complementary devices may also be employed alone or in conjunction with belt 143 to transfer articles along the designated path (I). One such alternate structure includes a series of transverse rollers without the above disclosed belt 143. The rollers are designed to cooperatively transfer rotational energy and transport at least one article along the designated path (I). These methods and configurations will be readily recognizable by one of ordinary skill in the art.

In an embodiment, the belt assembly 140 may originate at an article-manufacturing device (not shown) that is implemented in or adapted to be integrated with a manufacturing system (not shown). In contrast, the present system 100 may instead be employed as a stand-alone unit where the articles are placed on the article transfer member 110 by an automated device or manually.

It will be appreciated that, in one embodiment, the present system 100 facilitates transfer and packaging of the articles from their origin to their destination, which for purposes of illustration, is located in a package in an automated packaging machine. Two examples of such packages are a bag and a box. However, other destinations are within the scope of the present invention. For example, the destination could be any type of receptacle, storing location, or the like With continued reference to the embodiment of FIG. 2, the orientation-adjusting portion 120 includes an orienter 150. The orienter 150 adjusts each of the cups that pass thereby to align distinguishing features of the cups with the distinguishing feature or features of the outermost one of the cups in the already oriented bundled stack of cups. In one embodiment, at least a portion of this bundled stack of cups resides in the receiving portion 130 and extends into at least a portion of the orientation-adjusting portion 120, the details of which will later be discussed below.

In an embodiment, the orienter 150 of the orientation-adjusting portion 120 is a rotating device 160. However, it is also contemplated by the inventors that other orientation adjusting mechanisms, such as an agitation device or the like, may be employed to adjust the orientation of a transferred cup. In the embodiment shown in FIG. 2, the rotating device 160 is located between the article transfer member 110 and the receiving portion 130. In this embodiment, the rotating device 160 may be disposed substantially flush with the article transfer member 110 and the receiving portion to form at least a portion of the designated path (I). In this manner, the cups are transferred over the rotating device 160 to the receiving portion 130 with little or no lateral movement.

Figure 3:
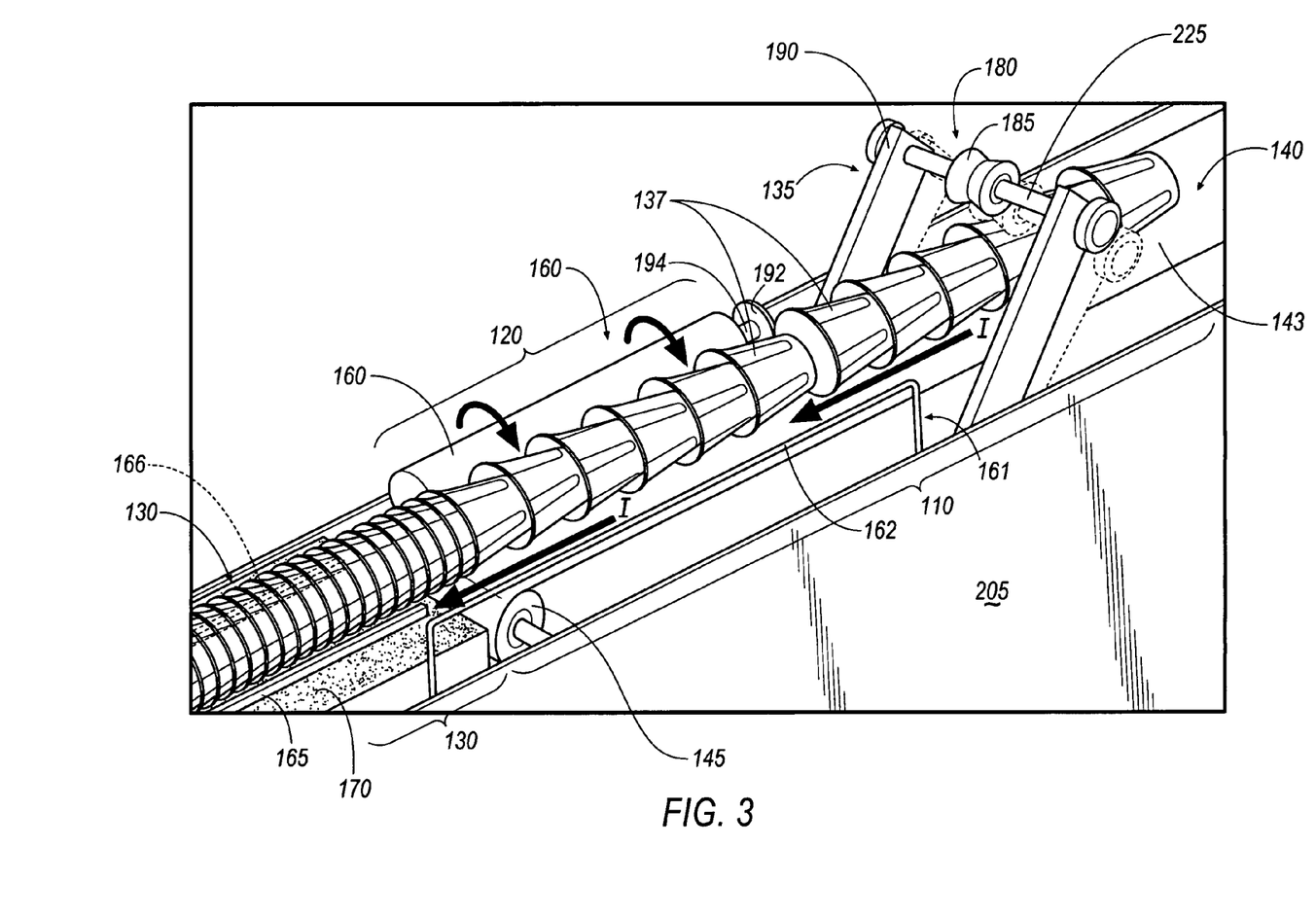
FIG. 3 is a perspective view of an article transfer system according to another embodiment of the present invention.
Figure 4:
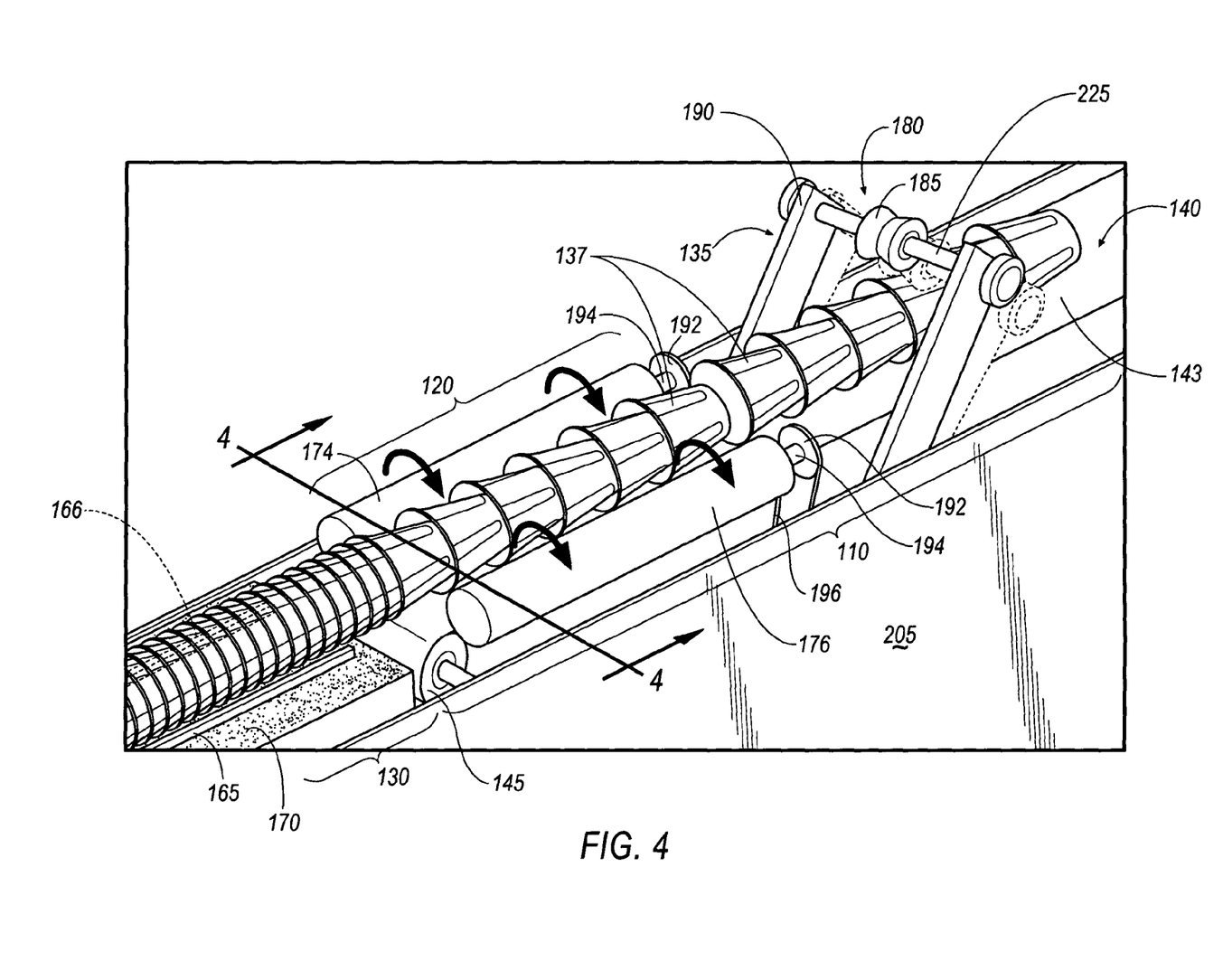
FIG. 4 is a perspective view of an article transfer system according to yet another embodiment of the present invention.

The rotating device 160 may be configured to contact at least a portion of the cup as it is transferred thereover. As shown in FIGS. 2-4, the rotating device 160 rotates the cups in a direction transverse to the designated path (I). Thus, the rotating device 160 engages a portion of the cup and sufficiently orients the cup while the cup continues to travel along the designated path (I). In this manner, the rotating device 160 grips at least a portion of the cup. One way to ensure a proper grip is to make the roller 160 out of material having a suitable coefficient of friction, such as rubber, plastic, or the like. Another way to ensure such a grip is to affix material or structure to the rotating device 160, such as a sheath that comprises similar material, or other devices that create a similar coefficient of friction. It should be noted that the weight of the cups due to gravitational force further facilitates such a grip.

With continued reference to FIG. 2, the orientation-adjusting portion 120 has at least one retaining region 161. In an embodiment, retaining region 161 is located on opposite sides of the orientation adjusting portion generally transverse to the direction in which the roller 160 rotates. In this manner, as the roller rotates the cups and adjusts them to their proper orientation, the retaining region 161 substantially prevents the cups from moving away from, or off, the designated path (I). When so configured, the retaining region 161 substantially corrals the cups into the receiving portion 130. In the illustrated embodiment, the retaining region 161 includes two support bars 162 that are connected to a frame 205 surrounding the article transfer member 110. However, other structures to accomplish this function are equally possible. One example of such a structure includes a series of retaining posts provided adjacent the rotating device, walls or other suitable structures.

It is noted that the rotating device 160 could be positioned at any point adjacent the article transfer member 110. In this way, with reference now to FIG. 3, another possible arrangement for positioning the rotating device 160 is shown. In this embodiment, the rotating device 160 is longitudinally positioned over the article transfer member 110 at a distance therefrom. In an embodiment, the distance is related to the size of the article to be transferred. For example, the distance is substantially similar to the largest engageable diameter of the cup, which, in this example, is the lip of the cup.

In an embodiment, the rotating device 160 is connected to a biasing device that biases the rotating device 160 into contact with the cup to adjust the cup's orientation. However, the biasing device also prevents the force provided from the rotating device 160 from damaging or marring the cup. Biasing device may be adjustable to permit rotating device 160 to accommodate different size articles.

In an embodiment, the biasing device includes a spring having a first end connected to the rotating device 160 and a second end connected to a substantially rigid member, such as the structure upon which article transfer member 110 is secured. The spring provides a predetermined amount of force on the rotating device. One of ordinary skill in the art will recognize that other alternatives to a spring are equally forseeable, which will be recognized when combined with the present disclosure.

With reference to FIGS. 2-4, the rotating device 160 is configured to rotate in a direction that is generally perpendicular to the designated path (I) that the belt assembly 140 transfers the articles. However, it is noted that the rotating device 160 may be adapted to move in any direction that includes a transverse rotational element. Thus, for example, the rotating device 160 may rotate in a direction at or between 1 and 179 degrees from the direction at which the belt assembly 140 travels. It will also be appreciated that the length of the rotating device 160 may be a function of a number of factors, including without limitation, the speed at which the article transfer member 110 moves, the speed at which the rotating device 160 rotates, the type of article to be transferred, and the type of distinguishing feature of the article.

Alternate configurations or positions for the rotating device 160 than the configurations or positions already described are also foreseeable. As such, it is noted that in combination with the present disclosure, any combination of a transfer member 110, an orientation-adjusting portion 120, and a receiving portion 130 should readily become apparent to one of ordinary skill in the art when considering the present disclosure. Furthermore, as shown in FIG. 4, article transfer system 100 may include more than one rotating device 174, 176.

With regard to the at least one rotating device 160, 174, 176 from FIGS. 2-4, an exemplary method for connecting the device to a motor and driving the device is shown and described. In the embodiments illustrated in FIGS. 2-4, the rotating device includes a drive gear 192 connected to a shaft 194. The shaft 194 forms a portion of the roller. A motor (not shown) is connected to the roller and communicates the movement to the gear using a belt (not shown) threaded around the motor and the drive gear 192. It is noted, however, that other mechanisms may be employed to transfer such rotation to the shaft, such as a system of meshing gears, a chain, a cam and shaft assembly, or the like. Additionally, hydraulic, pneumatic, or other motion transferring devices may be used to transfer the power for rotation. Further, although a shaft is shown and described, other devices may be used to rotate the cups, such as a belt threaded over a roller or a series of rollers that are adapted to move in a direction generally transverse to the designated path (I).

Referring again to FIG. 2, the receiving portion 130 is provided in communication with the adjusting portion 120 and forms at least a portion of the designated article path (I). In combination with the adjusting portion 120, the receiving portion 130 provides structure that allows the cups to form an integrated, bundled stack. In an embodiment, the receiving portion 130 is a surface that includes a material 170 having a coefficient of friction that is suitable to achieve the above desired effect. That is, the friction from the receiving portion 130 restricts or prevents further longitudinal rotational movement of the cups as they become added to the bundled stack. This leads to the proper orientation, alignment, and interlocking of adjacent cups within the stack. The increase friction imposed by material 170 also acts to decelerate or slow the forward progress of the unbundled cups along the designated path (I) as they enter, or approach, the receiving portion 130.

Thus, when a subsequent unbundled cup to be stacked within the orientation-adjusting portion 120 approaches the bundled stack, the resultant force from the bundled stack, in combination with the forward movement of the cup to be stacked and the orientative rotation from the rotating device 160, facilitates forward movement of the unbundled cup as the distinguishing features becomes aligned. In this manner, new cups are added to the bundled stack.

It should be noted that movement of the bundled stack along the designated path (I) within the receiving portion 130 does not have to stop completely. Rather, the bundled stack in the receiving portion 130 moves along the designated path (I) at a lesser rate then the movement of the unbundled cups in the orientation-adjustment portion 120. This relationship allows the system 100 to continually bundle the cups. However, one of ordinary skill in the art will recognize that the receiving portion 130 may be configured to completely stop movement of the bundled stack. The combined force that results from the deceleration of the bundled cups as they enter the receiving portion 130 and the rotational movement of the unbundled cup facilitates proper cup alignment by enabling the formation of a bundled stack. Thus, while the unbundled cups that reside in the orientation-adjustment portion 120 are rotated to become correctly oriented, the bundled stack of aligned cups within the receiving portion 120 does not rotate to allow subsequent cups to be added to the stack when properly aligned.

Referring again to FIGS. 2-4, the illustrated receiving portion 130 includes a first guide member 165 and a second guide member 166. The guide members 165, 166 inhibit movement of the bundled stack relative to the designated path (I). The guide members may also be configured to provide an additional decelerating force to the cups. However, it should be noted that the present invention could be practiced without the guide members 165, 166 or that structures other than guide members 165, 166, such as a groove formed in the receiving portion 130, may be used to inhibit movement or rotation of the bundled stack relative to the designated path (I). In another example, polymeric stoppers may be affixed to the floor or sides of the receiving portion 130, or other protruding mechanisms that restrict movement of the cups. In yet another example, receiving portion may include a mechanism having a detent affixed to at least a portion of the receiving portion 130 that contacts the cups, or may be sloped to such a degree that gravity provides the requisite holding force.

It is additionally noted, that the receiving portion 130 may also include a second transfer member (not shown) that moves at a lesser rate then the previously disclosed transfer member 110. If desired, the second transfer member continues transferring the bundled cups down the designated path (I) to their destination. These and similar structures will become readily apparent to one of ordinary skill in the art.

In the embodiment illustrated in FIGS. 2-4, the article transfer system 100 also include an optional compressing member 135 adapted to regulate the amount of cups that progress into the orientation-adjusting portion 120 or the receiving portion 130. In one mode of regulation, the receiving portion 130 slows the transfer of the bundled articles along the designated path (I).

In the illustrative embodiments, the compressing 135 member is positioned over the article transfer member 110. The compressing member 135 includes an engagement device 180 that is rotatably connected to a support 190. The engagement device 180 provides a compressive force on the articles transferring thereunder to ensure that the movement from the article transfer member 110 is sufficiently transferred to the cups. This further ensures that the cups satisfactorily move along the designated path (I).

With continued reference to FIGS. 2-4, the support 190 of the compressing member 135 is pivotally connected to a frame 205 that surrounds the article transfer member 110. In one example, the compressing member 135 is in communication with an actuator (not shown). In this manner, the actuator pivots the compressing member 135. The pivot function allows the actuator to control the compressive force imposed on the passing articles by the compressing member 135. As illustrated in phantom, this pivoting movement raises and lowers the compressing member 135.

In an embodiment, the actuator at least moves, or pivots, the compressing member at pre-defined intervals from a first position to a second position and thereback. One way to set the pre-defined intervals is to define time intervals. Other examples of possible intervals to move the compressing member 135 include, among other things, the number of articles, the weight exhibited on the system 100, a detected article movement, a force measurement, or the like. In an embodiment, the actuator is connected to an optional sensor or the like that determines the intervals previously mentioned. The sensor may be located within the receiving portion 130 or the orientation-adjusting portion 120.

In an embodiment, the device 180 is a rolling member 185 rotatably attached to a shaft 225. The rolling member 185 includes bearings (not shown) or the like disposed between the shaft 225 and the rolling member 185. The rolling member 185 contacts at least a portion of the cups passing thereunder. In a first position, the device exerts a first force on the cups. The first force allows the articles to pass under the compressing member 135 while the rolling member 185 rotatably contacts at least a portion of the articles. A small amount of force exerted upon the cups aids in transferring article through system 10. In the illustrated configuration, the exerted force allows the cups to continue passing into the adjusting portion 120.

In the second position (shown in phantom), the device exerts a greater amount of force on the cups to substantially pin the articles between the moving article transfer member 110 and the compressing member 135. This added force prohibits further cups from entering the orientation adjustment portion 120, and still allows the article transfer member 110 to continue moving. In a manufacturing system (not shown), such a phenomenon allows continuous placement of subsequent articles on the article transfer member 110 so the manufacturing system does not backlog. As such, the rolling member 185 does not rotate and the article transfer member 110 simply continues to pass under the cups. Such a position is effective to stave off or remedy a buildup of articles in either the orientation-adjusting portion 120 or the receiving portion 130. This feature also allows the article transfer member 110 to continue moving while preventing movement of the article down the designated path (I). It should be noted, however, that compressing member 135 is but only one example of how to regulate the progression of articles within system 100 and is not intended to be limited thereto.

Figure 4A:
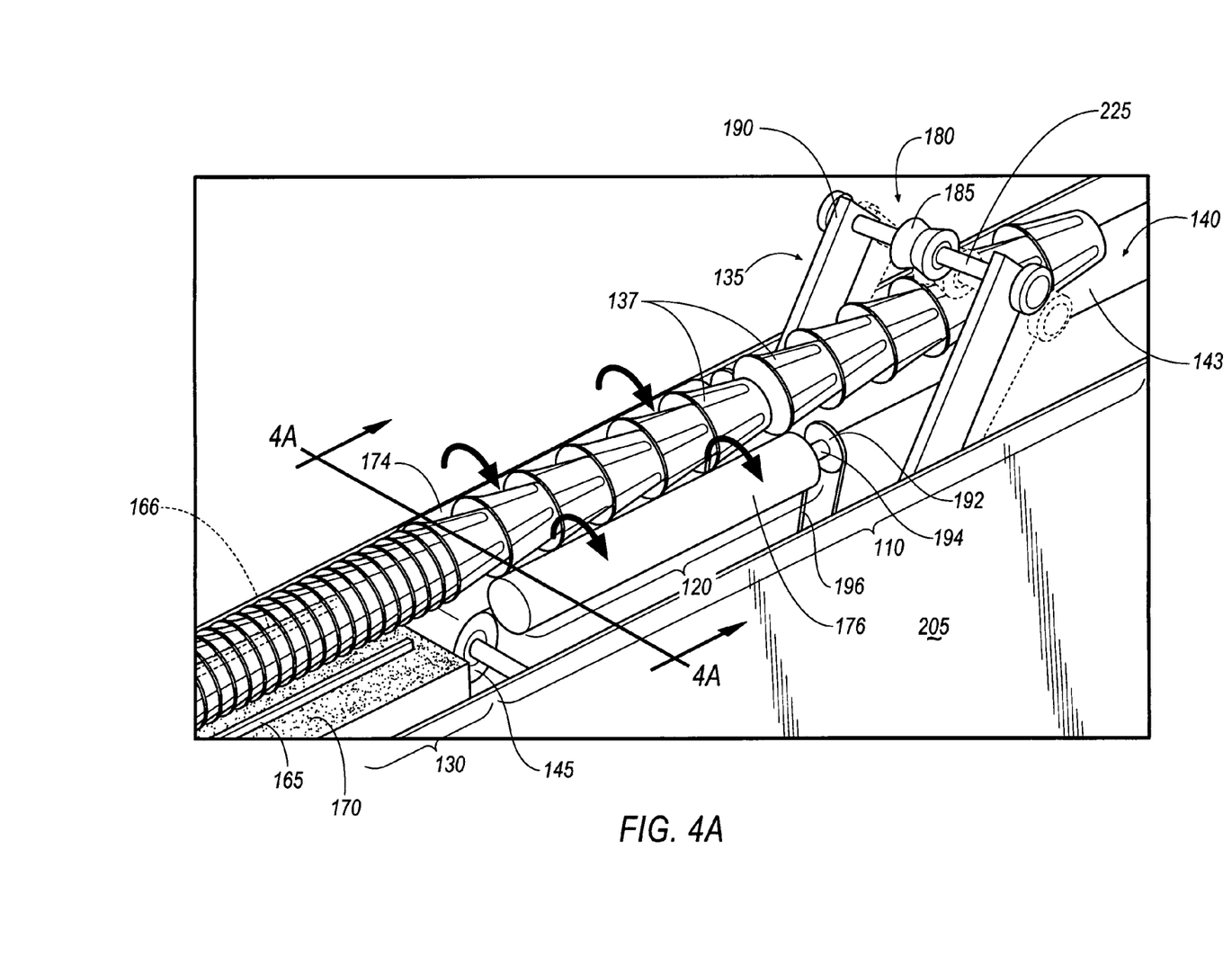
FIG. 4A is a perspective view of an article transfer system according to yet another embodiment of the present invention.

With reference now to FIGS. 4 and 4A, an orienter 150 according to another embodiment of the present invention is shown and described. In this example, the orienter 150 includes a first rotating device 174 and a second rotating device 176. The first and second rotating devices 174, 176 are positioned over adjacent sides 177, 178 of the article transfer member 110 and extend therealong. The first and second rotating devices 174, 176 extend longitudinally from the receiving portion over the article transfer member 110. As briefly referenced above, various factors may be considered to determine the rotational speed of the rotating devices 174, 176, including without limitation, the orientation of the article to be adjusted, the weight of the article to be adjusted, the length of the rotating devices 174, 176, and the like. In an embodiment, each the first and second rotating devices 174, 176 rotate in the same direction to adjust the orientation of the cup.

Figure 5:
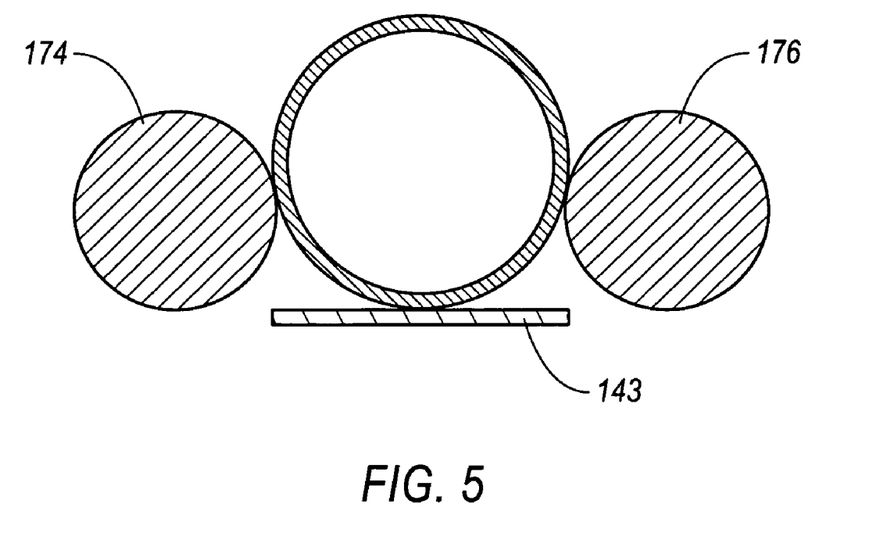
FIG. 5 is a cross-sectional view of an article transfer system according to an embodiment of the present invention.

Referring now to FIG. 5 a cross-sectional view of the orienter 150 from FIG. 4 taken along the line 4 is illustrated. The first and second rollers 174, 176 form an opening for the cup. In this manner, the first and second rollers 174, 176 each rotate the cup wherein at least a portion of the cup maintains sufficient contact with at least a portion of the article transfer member 110. Thus, the article transfer member moves the cup along the designated path (I) while the first and second rollers 174, 176 impose transverse movement on at least a portion of the cup, which rotates the cup into proper orientation. As described above, this transverse rolling motion adjusts the cup so that a distinguishing feature in an unbundled cup is substantially aligned with a distinguishing feature on a bundled cup in the receiving portion 130.

Figure 5A:
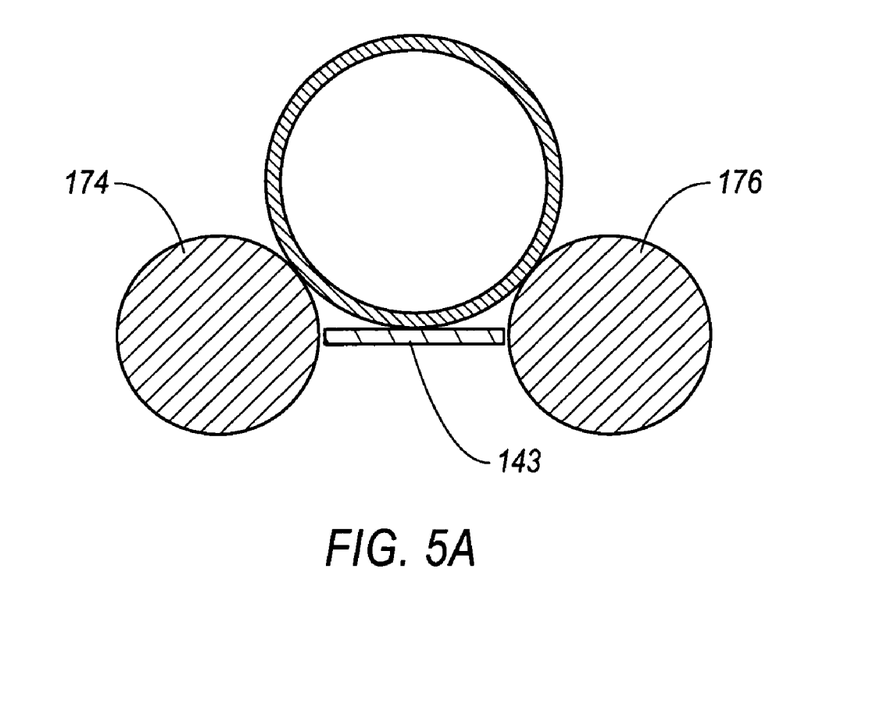
FIG. 5A is a cross sectional view of another article transfer system according to another embodiment of the present invention.

FIG. 5A illustrates a cross-sectional view of the orienter 150 of the article transfer system shown in FIG. 4A taken along the line 4A. In contrast to the embodiment shown in FIG. 5, which includes first and second rollers 174, 176 arranged over the article transfer member 110 to support or cradle the cup, the article transfer member 110 in FIG. 5A is elevated between the first and second rollers 174, 176. In this manner, the first and second rollers 174, 176 rotate and contact at least a portion of the cup at a lower elevation level on the cup then the embodiment illustrated at FIG. 5.

Figure 6:
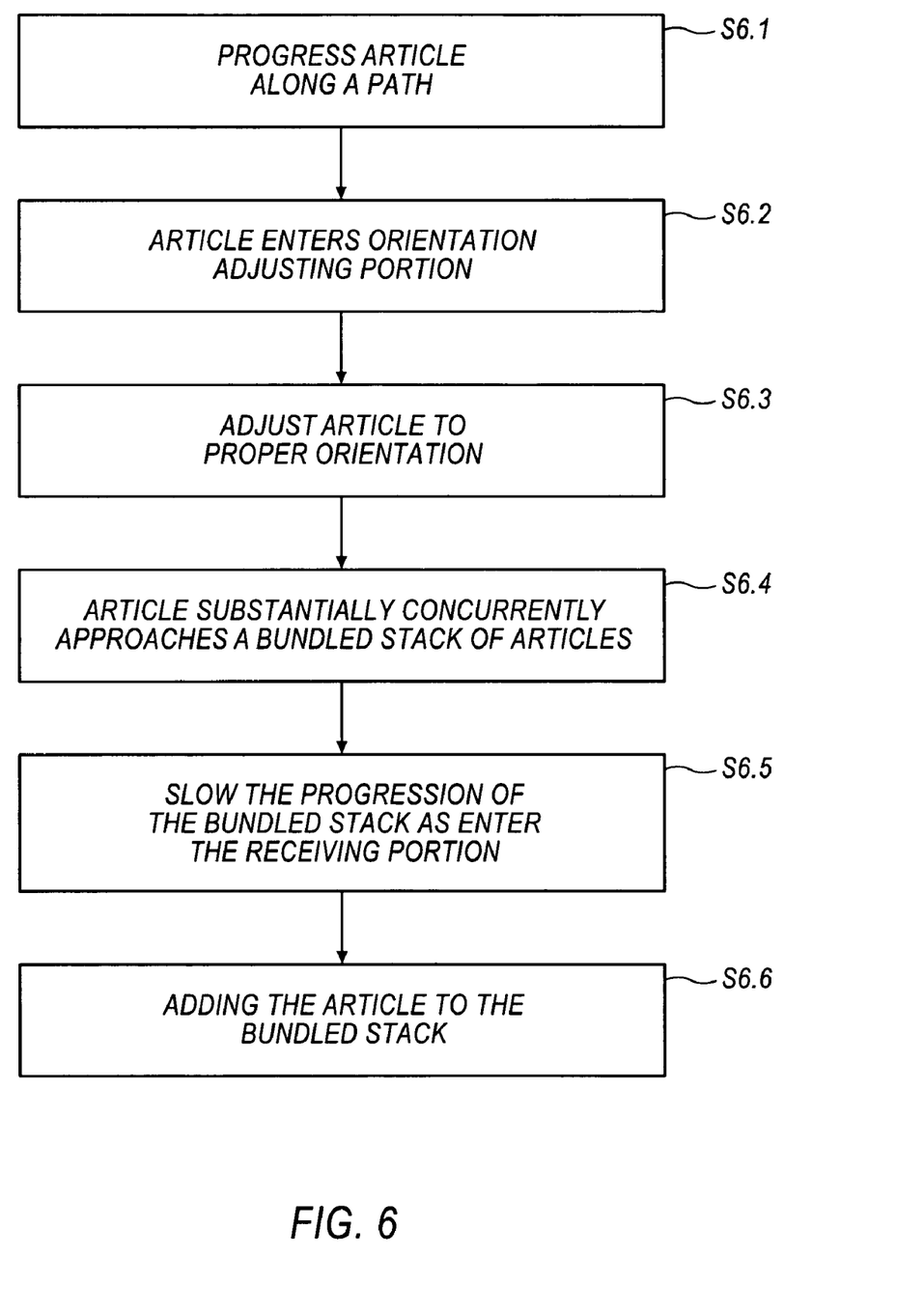
FIG. 6 is a flowchart of a method for bundling a stack of articles according to an embodiment of the present invention.

With reference now to FIG. 6, an exemplary method for generating a bundled stack of articles is illustrated in a flowchart form and will now be described. It is noted that alternate methods then the one described may be implemented on the structure previously provided that will form the bundled stack of articles. Such alternate methods will be immediately recognizable in combination with the present disclosure. In other words, the alternate methods are simply variations to the one provided herein and only minor configurations to the presently described method are implemented to derive such.

In an embodiment, at least one article progresses along the designated path (I), step S6.1, in the article transfer member. The at least one article next enters the orientation-adjusting portion in step S6.2, wherein an orienter adjusts the orientation of the article in step S6.3. As the adjustment step in S6.2 occurs, the article approaches a bundled stack of articles in step S6.3. The bundle of articles extends into at least a portion of the orientation-adjusting portion from the receiving portion in step S6.4. It should be noted that, in one embodiment, the forward progression of the bundled stack of articles along the designated path (I) is slower then the progression of the article to be stacked in step S6.5. In another embodiment, the bundled stack of articles does not progress along the designated path (I). As the article is oriented, the movement of the at least one article combined with the adjustment of the at least one article and the slower or stopped progression of the bundled stack of articles provides that the at least one article is added to the bundled stack of articles in step S6.6.

While the foregoing has described what are considered to be preferred embodiments of the present invention, it is understood that various modifications may be made therein and that the invention may be implemented in various forms and embodiments, and that it may be applied in numerous applications, only some of which have been described herein.

It is intended by the following claims to claim all such modifications and variations, which fall within the true scope of the invention.

What is claimed is:

1. A transfer system for open-ended containers and suitable for use in an automated bagging device, the transfer system comprising:
   a transfer member adapted to transfer the open-ended containers along a designated path in a machine direction;
   an orientation-adjustment portion having an orienter that is adapted to rotate at least a first portion of the open-ended containers about an axis of rotation with open ends of the containers facing in the machine direction; and
   a downstream receiving portion that is adapted to restrict movement of at least a second portion of the open-ended containers along the designated path,
   wherein said orienter is at least one roller having an axis of rotation that is substantially parallel to the machine direction, and whereby the roller imparts a rotational motion to the open-ended containers while the transfer member separately imparts machine direction motion to the open-ended containers,
   wherein each open-ended container has a surface configuration with a distinguishing feature that (i) allows adjacent open-ended containers to closely nest along an axial direction of the open-ended containers when the distinguishing features of the adjacent open-ended containers are rotationally aligned and (ii) prevents adjacent open-ended containers from closely nesting along the axial direction when the distinguishing features of the adjacent open-ended containers are not rotationally aligned, where the axial direction runs parallel to the machine direction,
   and further wherein said receiving portion and said orienter cooperate to align said first portion and said second portion such that the distinguishing feature of open-ended containers in the first portion becomes aligned with the distinguishing feature of open-ended containers in the second portion and such alignment allows open-ended containers of the first portion to become closely nested with open-ended containers of the second portion to compress a length of said open-ended containers.

2. The transfer system according to claim 1, wherein said receiving portion further includes at least one detent that restricts rotation of the open-ended containers.

3. The transfer system according to claim 1, wherein said receiving portion includes a surface adapted to abut open-ended containers to restrict movement of the open-ended containers.

4. The transfer system according to claim 1, said system further comprising:
   an article entrance reduction member that cooperates with said transfer member to reduce an amount of open-ended containers from entering said orientation-adjustment portion when a predetermined condition occurs.

5. The transfer system according to claim 4, wherein the transfer member is a conveyor.

6. The transfer system according to claim 5, wherein said reduction member is a compression member that is adapted to:
   press open-ended containers against the transfer member when the predetermined condition does not occur, and
   not press open-ended containers against the transfer member when the predetermined condition occurs.

7. The transfer system according to claim 5, wherein said predetermined condition is selected from the group consisting of a weight limit, an article number limit, a time interval, a force constraint, or any combination thereof.

8. The transfer system according to claim 1, wherein said roller is arranged over said transfer member whereby said roller is adapted to contact the first portion of the open-ended containers.

9. The transfer system according to claim 1, wherein:
   said orientation-adjusting portion includes a biasing device adapted to press said roller against at least a portion of said open-ended containers.

10. The transfer system according to claim 9, wherein the biasing device is adjustable.

11. The transfer system according to claim 1, wherein said roller is adapted to rotate an open-ended container in a direction having a primary lateral component and said transfer member is arranged to transfer the open-ended container in a direction having a primary longitudinal component.

12. The transfer system according to claim 1, wherein said orienter comprises two rollers arranged to form a cradle for the open-ended container, such that the transfer member contacts at least a portion of the open-ended container to transfer motion thereto.

13. The transfer system according to claim 1, wherein said orienter includes a first end and a second end, said system further comprising:
   an actuated compressing member positioned before said first end of said orienter; and
   wherein said actuated compressing member is in communication with at least one of said article adjustment portion, said article receiving portion, and said transfer member.

14. A method for compressing an axial length of a bundle of open-ended containers said method comprising:
   providing a plurality of open-ended containers, wherein each of said open-ended containers has a surface configuration with a distinguishing feature that (i) allows adjacent open-ended containers to closely nest along an axial direction of the open-ended containers when the distinguishing features of the adjacent open-ended containers are rotationally aligned and (ii) prevents adjacent open-ended containers from closely nesting along the axial direction when the distinguishing features of the adjacent open-ended containers are not rotationally aligned;
   transporting said plurality of open-ended containers in a group together along a path that follows the axial direction;
   rotating at least a first portion of said open-ended containers;
   restricting movement of at least a second portion of said open-ended containers in said machine direction downstream of said first portion; and
   aligning said first portion and said second portion of said articles through said rotating and said restricting steps to cause the distinguishing feature of open-ended containers in the first portion to align with the distinguishing feature of open-ended containers in the second portion such that open-ended containers of the first portion become closely nested with open-ended containers of the second portion to compress the axial length of said open-ended containers.

15. The method according to claim 14, further comprising:
   slowing movement of the second portion such that movement of the first portion along the path is greater than movement of the second portion along the path.

16. The method according to claim 15, further comprising:
utilizing an orientation adjustment device to perform the rotating step; and
preventing articles from entering the orientation adjustment device when a predetermined condition occurs.

17. The method according to claim 16, wherein said condition is selected from the group consisting of a weight limit, an article number limit, a time interval, a force constraint, or any combination thereof.

18. The method according to claim 16 further comprising a conveyor that performs the transporting step.

19. A method for compressing an axial length of a bundle of articles, said method comprising:
providing a plurality of open-ended articles, wherein said plurality of articles have their open ends facing in a machine direction and each of said articles has a surface configuration with a distinguishing feature that (i) allows adjacent articles to closely nest along the machine direction when the distinguishing features of the adjacent articles are rotationally aligned and (ii) prevents adjacent articles from closely nesting along the machine direction when the distinguishing features of the adjacent articles are not rotationally aligned;
transporting said plurality of articles in a group together along the machine direction;
rotating at least a first portion of said articles with the open ends of said articles facing in the machine direction throughout the rotating step;
restricting movement of at least a second portion of said articles in said machine direction downstream of said first portion; and
aligning said first portion and said second portion of said articles through said rotating and said restricting steps to cause the distinguishing feature of articles in the first portion to align with the distinguishing feature of articles in the second portion such that articles of the first portion become closely nested with articles of the second portion to compress the axial length of said articles,
wherein an orientation-adjustment portion performs the rotating step, said orientation-adjustment portion comprising two spaced apart rollers each having an axis of rotation that is substantially parallel to the machine direction, and whereby the rollers impart a rotational motion to the articles, the two spaced apart rollers arranged to form a cradle for the articles.

20. A method for compressing an axial length of articles, said method comprising:
providing a plurality of open-ended articles, wherein said plurality of articles have their open ends facing in a machine direction and each of said articles has a surface configuration with a distinguishing feature that (i) allows adjacent articles to closely nest along the machine direction when the distinguishing features of the adjacent articles are rotationally aligned and (ii) prevents adjacent articles from closely nesting along the machine direction when the distinguishing features of the adjacent articles are not rotationally aligned;
transporting said plurality of articles in a group together along the machine direction while maintaining the open ends facing in the machine direction;
rotating at least a first portion of said articles with the open ends of said articles facing in the machine direction throughout the rotating step and while said first portion of said articles are moving in the machine direction;
restricting movement of at least a second portion of said articles in said machine direction downstream of said first portion such that articles of the first portion move in the machine direction faster than articles of the second portion; and
aligning said first portion and said second portion of said articles through said rotating and said restricting steps to cause the distinguishing feature of articles in the first portion to align with the distinguishing feature of articles in the second portion such that articles of the first portion become closely nested with articles of the second portion to compress the axial length of said articles.

21. The method of claim 20 wherein articles of the first portion are moved in the machine direction by a transfer member and articles of the first portion are rotated by a separate orienting member.

* * * * *